United States Patent
Martin et al.

(10) Patent No.: US 8,447,316 B2
(45) Date of Patent: May 21, 2013

(54) METHOD AND APPARATUS FOR COMMUNICATING HIDDEN COMMON ENHANCED DEDICATED CHANNEL RESOURCES

(75) Inventors: Brian Martin, Farnham (GB); Keiichi Kubota, Weybridge (GB)

(73) Assignee: Renesas Mobile Corporation, Tokyo (JP)

( * ) Notice: Subject to any disclaimer, the term of this patent is extended or adjusted under 35 U.S.C. 154(b) by 63 days.

(21) Appl. No.: 13/251,685

(22) Filed: Oct. 3, 2011

(65) Prior Publication Data

US 2013/0084877 A1    Apr. 4, 2013

(51) Int. Cl.
*H04W 72/00*    (2009.01)

(52) U.S. Cl.
USPC ............... 455/452.1; 455/450; 455/452.2; 370/329; 370/330

(58) Field of Classification Search
USPC ............... 455/450–452.2; 370/328–330, 318
See application file for complete search history.

(56) References Cited

U.S. PATENT DOCUMENTS

| | | | |
|---|---|---|---|
| 5,652,752 A * | 7/1997 | Suzuki et al. | 370/330 |
| 7,161,916 B2 * | 1/2007 | Malladi et al. | 370/332 |
| 7,664,141 B2 * | 2/2010 | Zhuyan | 370/477 |
| 8,031,738 B2 * | 10/2011 | Kuo | 370/439 |
| 8,086,257 B2 * | 12/2011 | Bachl et al. | 455/515 |
| 8,160,029 B2 * | 4/2012 | Dominique et al. | 370/335 |
| 8,320,307 B2 * | 11/2012 | Niwano | 370/329 |
| 2008/0144741 A1 * | 6/2008 | Dominique et al. | 375/317 |

FOREIGN PATENT DOCUMENTS

| | | |
|---|---|---|
| EP | 1 437 912 A1 | 7/2004 |
| EP | 1 983 676 A1 | 10/2008 |
| EP | 2 034 757 A1 | 3/2009 |
| GB | 2 416 963 A | 8/2006 |
| WO | WO 03/067903 A2 | 8/2003 |
| WO | WO 2008/025708 A2 | 3/2008 |
| WO | WO 2010/121567 A1 | 10/2010 |

OTHER PUBLICATIONS

Intellectual Property Office, Combined Search and Examination Report for UK Application No. GB1116974.5, dated Feb. 6, 2012, 9 pages, United Kingdom.
$3^{rd}$ Generation Partnership Project Members, "WID Update to Further Enhancements to CELL_FACH (core part), Agenda Item 11.1.7.1," *3GPP TSG-RAN Meeting#52*, May 31-Jun. 3, 2011, 6 pages, RP-110913, Slovakia.

(Continued)

*Primary Examiner* — Sharad Rampuria
(74) *Attorney, Agent, or Firm* — Alston & Bird LLP (57) ABSTRACT

A method, apparatus and computer program product are provided for communicating hidden common channel resources to a communication device(s). In this regard, a method is provided that includes sending a message, to a device of a cell, including data indicating items of system information relating to a number of communication channel resources of a first type of resource and receiving a response message from the device indicating that the device supports communication channel resources of a second type of resource. The method may further include determining a set of communication channel resources associated with the second type supportable by a network device to send the set of resources to the device in a reply message responsive to the indication that the device supports the communication channel resources of the second type. The method may also include receiving a selection, by the device, of a communication channel resource(s) of the set.

20 Claims, 5 Drawing Sheets

OTHER PUBLICATIONS

3rd Generation Partnership Project Members, "Support Concurrent Deployment of 2ms and 10ms TTI in a Cell, Agenda Item 10.1.3," *3GPP TSG RAN WG2 Meeting#75*, Aug. 22-26, 2011, 3 pages, R1-113968, Greece.

3rd Generation Partnership Project Members, "Concurrent 2ms and 10ms TTI Operations within a CELL_FACH, Agenda Item 10.1.3," *3GPP TSG-RAN WG2 Meeting#75*, Aug. 22-26, 2011, 3 pages, R2-114075, Greece.

3rd Generation Partnership Project Members,"On Concurrent Deployment of 2ms and 10ms TTI in a Cell in CELL_FACH, Agenda Item 10.1.3" *3GPP TSG RAN WG2 Meeting#75*, Aug. 22-26, 2011, 5 pages, R2-114111, Greece.

3rd Generation Partnership Project Members, "CELL_FACH Support for Concurrent Deployment of 2ms and 10ms TTI in a Cell, Agenda Item 10.1.3," *3GPP TSG-RAN WG2 Meeting #75*, Aug. 22-26, 2011, 4 pages, R2-114154, Greece.

3rd Generation Partnership Project Members, "3rd Generation Partnership Project, Technical Specification, Release 11, 3GPP TS 25.331," *3GPP*, Dec. 2011, 1910 pages, vol. 11.0.0, France.

* cited by examiner

METHOD AND APPARATUS FOR COMMUNICATING HIDDEN COMMON ENHANCED DEDICATED CHANNEL RESOURCES

TECHNOLOGICAL FIELD

Embodiments of the present invention relate generally to communications technology and, more particularly, to communicating hidden common enhanced dedicated channel resources to communication devices.

BACKGROUND

The communications between a mobile terminal and a serving cell, such as the uplink communications from the mobile terminal to the serving cell, may sometimes affect resource utilization, throughput, latency and coverage. To enhance uplink communications improvements, the ongoing evolution of wireless communications systems such as, for example the enhanced dedicated channel (E-DCH) in cell Forward Access Channel (FACH) (CELL_FACH) state feature was introduced into wireless standard specifications, such as the third generation partnership project (3GGP) Release 8 specifications.

Mobile terminals operating in a CELL_FACH mode may use a contention based E-DCH channel for uplink (UL) transmission rather than a traditional random access channel (RACH). The contention-based E-DCH channel allows for mobile terminals to transfer signaling and data at significantly higher data rates and for longer durations, which reduces transfer and state transition delays.

Support for concurrent deployment of transmission time interval (TTI) settings, (e.g., 2 ms and 10 ms), will be allowed for the common E-DCH in the CELL_FACH state in 3GGP Release 11 (Rel-11). In this regard, 3GGP Rel-11 supports concurrent deployment of 2 ms and 10 ms TTI settings in a cell. A single TTI setting, which may be determined and broadcast by a communications network, may be used by mobile terminals accessing the E-DCH in the CELL_FACH state within a particular cell. Additionally, for example, 3GPP Release 11 compliant mobile terminals may utilize 2 ms TTIs and 10 ms TTIs in a cell. While a smaller TTI, such as the 2 ms TTI, may be more advantageous from fast scheduling and latency standpoints, a larger TTI, such as the 10 ms TTI, may be more widely utilized by mobile terminals in a cell to reliably transfer signaling and data to the network, particularly in coverage limited scenarios. For instance, some 3GPP Release 8 (Rel-8) legacy mobile terminals may be able to utilize the 10 ms TTI but are typically unable to communicate via the 2 ms TTI. Since some mobile terminals of a cell may be able to utilize both the 2 ms and 10 ms TTIs, while other mobile terminals may only be able to utilize the 10 ms TTI, the network may need an efficient mechanism of communicating resources to the mobile terminals of a cell.

A number of mechanisms to enable a network to communicate resources to mobile terminals capable of supporting different TTIs have been proposed, however these mechanisms suffer from drawbacks. One approach for a network to communicate with mobile terminals capable of supporting different TTIs, involves a network splitting a physical random access channel (PRACH) signature space between legacy devices such as, for example, R99 and Rel-8 mobile terminals (e.g., utilizing 10 ms E-DCH TTI signatures and/or R99 PRACH signatures) that are capable of utilizing a 10 ms TTI and a signature space (e.g., utilizing 2 ms TTI signatures) for Rel-11 mobile terminals capable of using a 2 ms TTI and a 10 ms TTI. However, a drawback of this approach is that the signature space is limited which makes it difficult to allocate sufficient resources for a highly loaded cell. In this regard, utilizing this approach may be difficult to achieve an optimum balance between 10 ms TTI signatures (or resources) and 2 ms TTIs signatures to achieve the best resource utilization, quality of service and capacity.

Another approach that suffers from drawbacks involves a network utilizing a PRACH scrambling code to communicate 10 ms TTI signatures for legacy devices and an additional PRACH scrambling code for transmission of 2 ms TTI signatures to Rel-11 compliant mobile terminals in order to split the signatures for E-DCH transmission. Although this approach may be used to separate the traffic between Rel-11 compliant mobile terminals and legacy mobile terminals and may increase the signature space, additional signaling overhead on an already limited broadcast channel may be required, which may complicate an initial access procedure and may result in the network needing to schedule the system information differently which may impact the performance of all devices of the cell.

Another approach for a network to communicate resources to mobile terminals utilizing different TTIs involves the network signaling a TTI using a set of signatures that may refer to the same/first PRACH scrambling code (e.g., a PRACH scrambling code used for signatures of R99 and Rel-8 legacy devices), or it may refer to another/second scrambling code. However, this approach typically requires a new set of signatures to be defined to differentiate the Rel-11 compliant mobile terminals from legacy devices (e.g., R99 mobile terminals, Rel-8 mobile terminals). Moreover, an additional parameter is typically needed to identify the TTI utilized by each mobile terminal. By utilizing this approach, Rel-11 complaint mobile terminals may need to send a preamble on a new scrambling code and may indicate a signature corresponding to either the first or the second scrambling code. A drawback of this approach is that it typically introduces additional signaling overhead on a broadcast channel and may complicate the initial access procedure between the network and mobile terminals in a cell.

In view of the foregoing drawbacks, a more reliable and efficient manner of communicating resources to mobile terminals utilizing different capabilities may be beneficial.

BRIEF SUMMARY

A method, apparatus and computer program product are therefore provided according to an example embodiment in order to provide an efficient and reliable manner for providing hidden common communication channel resources to communication devices. In this regard, a network device of an example embodiment may provide one or more hidden common communication channel (e.g., E-DCH) resources by providing the common resources to particular communication devices that indicate that they are capable of supporting 2 ms common communication channel resources using dedicated signaling rather than communicating the 2 ms common communication channel resources to each communication device of a cell (e.g., a serving cell) using broadcast/common signaling.

In an example embodiment, in an instance in which a communication device initially communicates with a cell (e.g., a serving cell) the communication device may receive a number (e.g., up to 32) of 10 millisecond (ms) common communication channel resources corresponding to a 10 millisecond TTI from a network device (e.g., a base station (e.g., a Node B), a RNC) of the cell. In response to receipt of the 10 ms common communication channel resources, the communication device may determine that the communication device supports 2 ms common communication channel resources and may send the network device a message indicating that the communication device supports the 2 ms common communication channel resources.

In response to receipt of the message by the network device, the network device may send the communication device a set of 2 ms common communication channel resources (e.g., hidden 2 ms common E-DCH resources) that the network device is capable of supporting. Based in part on receipt of the set of 2 ms common communication channel resources from the network device, the communication device may select at least one of the 2 ms common communication channel resources of the set for reliably communicating and exchanging data with the network device.

In one example embodiment, a method is provided that includes causing sending of a message, to a device of a cell, including data indicating one or more items of system information relating to a number of communication channel resources associated with a first type of resource. The method may also include receiving a response message from the device indicating that the device supports communication channel resources associated with a second type of resource. The method may also include determining a set of communication channel resources associated with the second type of resource that are supported by a network device. The set of communication channel resources are determined to enable sending of the set of communication channel resources to the device in a reply message in response to the indication by the device that the device supports the communication channel resources associated with the second type of resource. The method may also include receiving an indication of a selection, by the device, of at least one of the communication channel resources of the set.

In another example embodiment, an apparatus is provided that includes at least one processor and at least one memory including computer program code with the at least one memory and the computer program code configured to, with the at least one processor, cause the apparatus at least to cause sending of a message, to a device of a cell, including data indicating one or more items of system information relating to a number of communication channel resources associated with a first type of resource. The at least one memory and the computer program code are also configured to, with the at least one processor cause the apparatus of this embodiment to receive a response message from the device indicating that the device supports communication channel resources associated with a second type of resource. The at least one memory and the computer program code are also configured to, with the at least one processor cause the apparatus of this embodiment to determine a set of communication channel resources associated with the second type of resource that are supported by a network device. The set of communication channel resources are determined to enable sending of the set of communication channel resources to the device in a reply message in response to the indication by the device that the device supports the communication channel resources associated with the second type of resource. The at least one memory and the computer program code are also configured to, with the at least one processor cause the apparatus of this embodiment to receive an indication of a selection, by the device, of at least one of the communication channel resources of the set.

In a further example embodiment, a computer program product is provided that includes at least one non-transitory computer-readable storage medium having computer-readable program instructions stored therein with the computer-readable program instructions including program instructions configured to cause sending of a message, to a device of a cell, including data indicating one or more items of system information relating to a number of communication channel resources associated with a first type of resource. The computer-readable program instructions of this embodiment also include program instructions configured to cause receipt of a response message from the device indicating that the device supports communication channel resources associated with a second type of resource. The computer-readable program instructions of this embodiment also include program instructions configured to determine a set of communication channel resources associated with the second type of resource that are supported by a network device. The set of communication channel resources are determined to enable sending of the set of communication channel resources to the device in a reply message in response to the indication by the device that the device supports the communication channel resources associated with the second type of resource. The computer-readable program instructions of this embodiment also include program instructions configured to cause receipt of an indication of a selection, by the device, of at least one of the communication channel resources of the set.

In yet another example embodiment, an apparatus is provided that includes means for causing sending of a message, to a device of a cell, including data indicating one or more items of system information relating to a number of communication channel resources associated with a first type of resource. The apparatus of this embodiment also includes means for receiving a response message from the device indicating that the device supports communication channel resources associated with a second type of resource. The apparatus of this embodiment also includes means for determining a set of communication channel resources associated with the second type of resource that are supported by a network device. The set of communication channel resources are determined to enable sending of the set of communication channel resources to the device in a reply message in response to the indication by the device that the device supports the communication channel resources associated with the second type of resource. The apparatus of this embodiment also includes means for receiving an indication of a selection, by the device, of at least one of the communication channel resources of the set.

In one example embodiment, a method is provided that includes receiving a message, from a network device of a cell, including data indicating one or more items of system information relating to a number of communication channel resources associated with a first type of resource. The method also includes determining that a device supports communication channel resources associated with a second type of resource to enable sending of the reply message to the network device. The reply message may indicate that the device supports the communication channel resources. The method may also include receiving, in a response message, a set of determined communication channel resources associated with the second type of resource that are supported by the network device in response to the indication that the device supports the communication channel resources associated with the second type of resource. The method may also include causing sending of an indication of a selection, of at least one of the communication channel resources of the set, to the network device.

In another example embodiment, an apparatus is provided that includes at least one processor and at least one memory including computer program code with the at least one memory and the computer program code configured to, with the at least one processor, cause the apparatus at least to receive a message, from a network device of a cell, including data indicating one or more items of system information relating to a number of communication channel resources associated with a first type of resource. The at least one memory and the computer program code are also configured to, with the at least one processor, cause the apparatus of this embodiment to determine that a device supports communication channel resources associated with a second type of resource to enable sending of the reply message to the network device. The reply message may indicate that the device supports the communication channel resources. The at least one memory and the computer program code are also configured to, with the at least one processor, cause the apparatus of this embodiment to receive, in a response message, a set of determined communication channel resources associated with the second type of resource that are supported by the network device in response to the indication that the device supports the communication channel resources associated with the second type of resource. The at least one memory and the computer program code are also configured to, with the at least one processor, cause the apparatus of this embodiment to cause sending of an indication of a selection, of at least one of the communication channel resources of the set, to the network device.

In a further example embodiment, a computer program product is provided that includes at least one non-transitory computer-readable storage medium having computer-readable program instructions stored therein with the computer-readable program instructions including program instructions configured to cause receipt of a message, from a network device of a cell, including data indicating one or more items of system information relating to a number of communication channel resources associated with a first type of resource. The computer-readable program instructions of this embodiment also include program instructions configured to determine that a device supports communication channel resources associated with a second type of resource to enable sending of the reply message to the network device. The reply message may indicate that the device supports the communication channel resources. The computer-readable program instructions of this embodiment also include program instructions configured to cause receipt, in a response message, of a set of determined communication channel resources associated with the second type of resource that are supported by the network device in response to the indication that the device supports the communication channel resources associated with the second type of resource. The computer-readable program instructions of this embodiment also include program instructions configured to cause sending of an indication of a selection, of at least one of the communication channel resources of the set, to the network device.

In yet another example embodiment, an apparatus is provided that includes means for receiving a message, from a network device of a cell, including data indicating one or more items of system information relating to a number of communication channel resources associated with a first type of resource. The apparatus of this embodiment also includes means for determining that a device supports communication channel resources associated with a second type of resource to enable sending of the reply message to the network device. The reply message may indicate that the device supports the communication channel resources. The apparatus of this example embodiment may also include means for receiving, in a response message, a set of determined communication channel resources associated with the second type of resource that are supported by the network device in response to the indication that the device supports the communication channel resources associated with the second type of resource. The apparatus of this example embodiment may also include means for causing sending of an indication of a selection, of at least one of the communication channel resources of the set, to the network device.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a scrambling code(s) may, but need not, denote a manner in which one or more mobile terminals (e.g., User Equipment (UE)) and/or network devices (e.g., a base station(s), access point(s), radio network controller(s) (RNCs), etc.) differentiate between different physical signals on a same frequency. As referred to herein, a signature(s) may, but need not, denote a manner in which one or more mobile terminals and/or network devices identify one or more best resources for selection to differentiate between different mobile terminal (e.g., UE) signals.

As referred to herein, hidden common communication channel resources or hidden common E-DCH resources or the like may denote provision of the common communication channel resources to particular communication devices indicating that they are capable of supporting 2 ms common communication channel resources associated with a particular timing parameter (e.g., a 2 ms TTI) using dedicated signaling rather than communicating the 2 ms common communication channel resources to each communication device of a cell (e.g., a serving cell) using a broadcast/common channel.

A method, apparatus and computer program product of an example embodiment are therefore provided for efficiently and reliably communicating hidden common communication channel resources to communication devices. In accordance with an example embodiment, a network device may provide one or more hidden common communication channel (e.g., E-DCH) resources by providing the resources to particular communication devices that indicate that they are capable of supporting 2 ms common communication channel resources rather than communicating the 2 ms common communication channel resources to each communication device of a cell (e.g., a serving cell). In this regard, a network device may restrict or prohibit the provision of one or more hidden common communication channel resources to communication devices that do not indicate that they are capable of supporting 2 ms communication channel resources.

Figure 1:
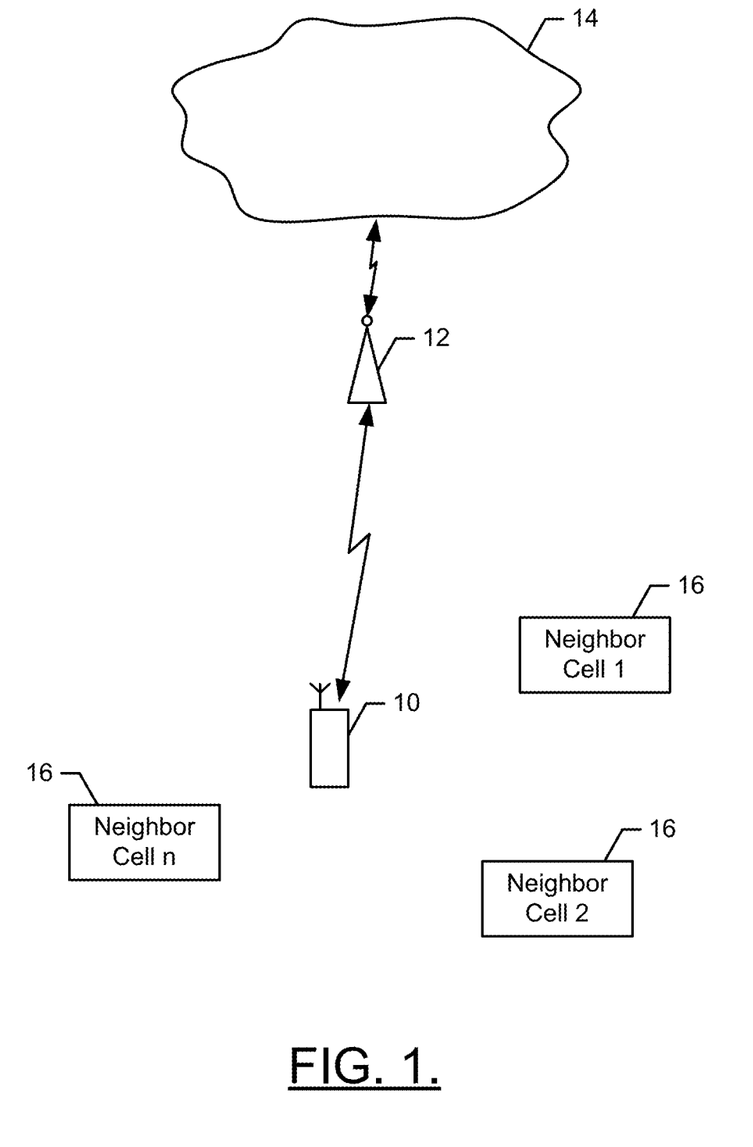
FIG. 1 is a schematic representation of a system that may benefit from an embodiment of the present invention.

Although the method, apparatus and computer program product may be implemented in a variety of different systems, one example of such a system is shown in FIG. 1, which includes a first communication device (e.g., mobile terminal 10) that is capable of communication via a serving cell 12, such as a base station, a Node B, an evolved Node B (eNB), a radio network controller (RNC) or other access point, with a network 14 (e.g., a core network). While the network may be configured in accordance with Long Term Evolution (LTE) or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more cells, including serving cell 12 and one or more neighbor cells 16 (designated neighbor cell 1, neighbor cell 2, ... neighbor cell n in the embodiment of FIG. 1), each of which may serve a respective coverage area. The serving cell and the neighbor cells could be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

A communication device, such as the mobile terminal 10 (also known as user equipment (UE)), may be in communication with other communication devices or other devices via the serving cell 12 and, in turn, the network 14. In some cases, the communication device may include an antenna for transmitting signals to and for receiving signals from a serving cell.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 14.

Figure 2:
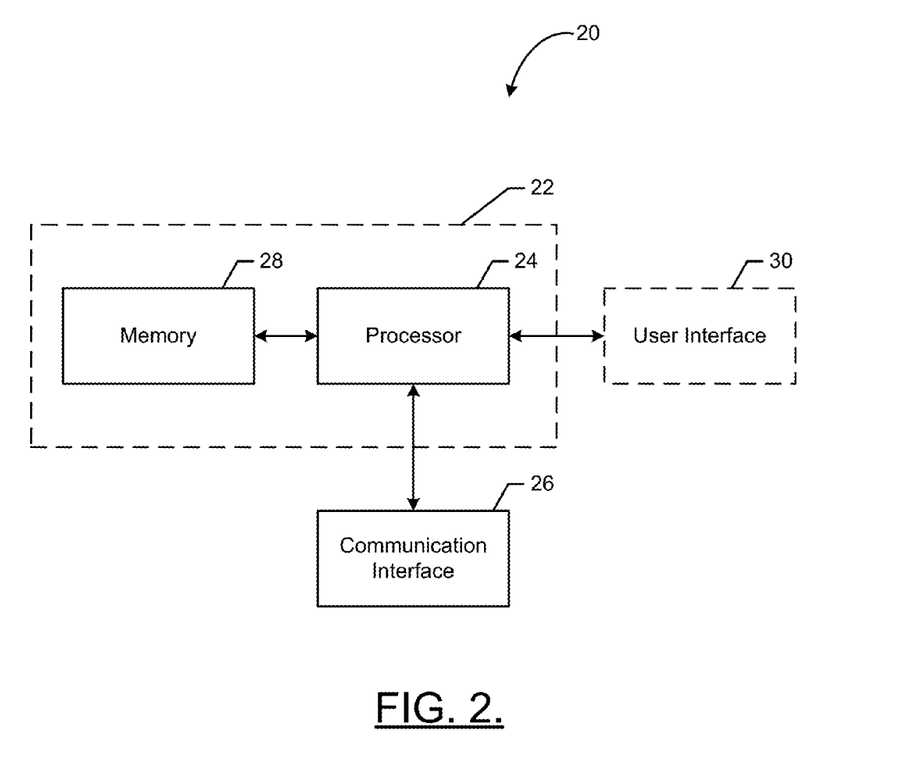
FIG. 2 is a block diagram of an apparatus that may be embodied by a mobile terminal in accordance with one embodiment of the present invention.

In one embodiment, for example, the mobile terminal 10, a neighbor cell 16 (also referred to herein as target cell 16) and/or the serving cell 12 may be embodied as or otherwise include an apparatus 20 as generically represented by the block diagram of FIG. 2. While the apparatus 20 may be employed, for example, by a mobile terminal 10, a neighbor cell 16 or a serving cell 12, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 28 that may be in communication with or otherwise control a communication interface 26 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. The apparatus 20 need not always include a user interface. For example, in instances in which the apparatus is embodied as a serving cell 12 or a neighbor cell 16, the apparatus may not include a user interface. As such, the user interface is shown in dashed lines in FIG. 2.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry 22, such as between the mobile terminal 10 and the serving cell 12 and/or a neighbor cell 16. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In an example embodiment, a mobile terminal 10 may be capable of utilizing one or more 2 ms TTI resources and one or more 10 ms TTI resources. In this regard, in an example embodiment, the mobile terminal 10 may be a 3GPP Rel-11 compliant mobile terminal. Consider an example in which the mobile terminal 10 initially communicates with the serving cell 12. In this regard, the mobile terminal 10 may initially select the serving cell 12 and may attempt to access the serving cell 12 based in part on using a PRACH signature(s) (e.g., a Rel-8 PRACH signature(s)) that may be signaled on a broadcast control channel (BCCH).

In this example embodiment, the serving cell 12 may not initially know whether the mobile terminal 10 is capable of utilizing 2 ms resources (also referred to herein as 2 ms common resources) associated with a 2 ms TTI(s). Since the serving cell 12 may not initially know whether the mobile terminal 10 is capable of utilizing 2 ms resources, the serving cell 12 may send the mobile terminal 12 system information and resources corresponding to a 10 ms TTI to reliably transfer signaling and data to the mobile terminal 10. The system information may include data specifying up to 32 10 ms common E-DCH resources (e.g., common E-DCH system information) corresponding to a 10 ms TTI.

In response to receipt of the system information from the serving cell 12, the processor of the mobile terminal 10 may send a message to the serving cell 12 in which the message may indicate that the mobile terminal supports of 2 ms TTI resources. In an example embodiment, the message may be a Radio Resource Control (RRC) Connection Request message, Cell Update message, a Universal Mobile Telecommunications System (UMTS) Terrestrial Radio Access Network (UTRAN) Registration Area (URA) Update message or any other suitable message. In response to the serving cell receiving the message from the mobile terminal 10 indicating that the mobile terminal is capable of supporting a 2 ms TTI resource(s), the processor of the serving cell 12 may provide a new set of hidden common E-DCH resources (also referred to herein as hidden 2 ms resources) to the mobile terminal 10 in a response message. The response message sent from the serving cell 12 to the mobile terminal 10 including the set of hidden common E-DCH resources may be a RRC Connection Setup message, a Cell Update Confirm message, a URA Update Confirm message or any other suitable message. As referred to herein, hidden common E-DCH resources may denote common E-DCH resources that are provided to a particular mobile terminal(s) (e.g., mobile terminal 10) by the serving cell 12 but which may not be (or are restricted from being) received by other mobile terminals (e.g., legacy devices (e.g., Rel-8 mobile terminals, R99 mobile terminals)) from the serving cell 12.

In an example embodiment, the new set of hidden common E-DCH resources received by the mobile terminal 10 from the serving cell 12 may, but need not, completely replace the resources (e.g., the 32 10 ms resources) that were previously signaled by the serving cell 12 on the broadcast control channel to the mobile terminal 10. For example, the serving cell 12 may provide a new set of hidden common E-DCH resources (e.g., also referred to herein as a new set of hidden common E-DCH signatures) to the mobile terminal 10 for a currently assigned scrambling code. In an alternative example embodiment, the serving cell 12 may assign a new scrambling code for utilizing the new set of hidden common E-DCH resources provided by the serving cell 12 to the mobile terminal 10 in the response message. In another alternative example embodiment, the serving cell 12 may add the new set of hidden common E-DCH resources to other resources (e.g., the 32 10 ms resources) signaled on the BCCH in the response message sent to the mobile terminal 10. In one example embodiment, the added resources may, but need not, total 64 resources (e.g., 32 resources corresponding to the 32 10 ms resources added to 32 hidden common E-DCH resources of the new set).

In response to receipt of the response message from the serving cell 12, the mobile terminal 10 may initiate a PRACH procedure for E-DCH resource allocation. In this regard, the mobile terminal 12 may choose a resource(s) corresponding to the new set of hidden common E-DCH resources. The resource(s) chosen (e.g., a 2 ms resource(s)) by the mobile terminal 10 may be a resource(s) (e.g., a best resource(s)) that the mobile terminal 10 decides that it should use for reliably communicating (e.g., transferring signaling and data) with the serving cell 12. In response to choosing the resource(s), the processor of the mobile terminal 10 may send a message to the serving cell 12 indicating the chosen resource(s).

Upon receipt of the selection of the chosen resource(s), the serving cell 12 may, but need not, send a message to the mobile terminal 10 indicating which common E-DCH resource(s) that the mobile terminal 10 should utilize during a common E-DCH resource allocation phase. The serving cell 12 may send the message, to the mobile terminal 10, indicating which common E-DCH resource(s) to utilize via a channel such as, for example, an Acquisition Indicator Channel (AICH) or an Enhanced AICH (E-AICH). In an example embodiment, the message indicating the common E-DCH resource sent from the serving cell 12 to the mobile terminal 10 may indicate a 10 ms TTI common resource(s) and/or a 2 ms TTI common E-DCH resource based in part on the availability of E-DCH resources at the serving cell 12.

In an instance in which the message indicating the common E-DCH resource sent to the mobile terminal 10, by the serving cell 12, corresponds to a 2 ms TTI common E-DCH resource(s), the mobile terminal 10 may utilize one or more 2 ms TTI resources for communication.

In an instance in which the mobile terminal 10 enters a new cell such as, for example, a neighbor cell 16, the mobile terminal 10 may clear all previously received resources (e.g., resources received from serving cell 12). In this regard, the mobile terminal 10 may clear the resources received from the serving cell 12, for example, since the mobile terminal 10 may not be aware of the resources that are available by a neighbor cell 16. In an alternative example embodiment, the mobile terminal 10 may clear all received resources when entering an Idle State. In another alternative example embodiment, the mobile terminal 10 may not clear the previously received resources and instead may store the previously received resources (e.g., the resources received from serving cell 12) and may utilize these resources while the mobile terminal 10 remains in a particular state such as, for example, a CELL_FACH state or a cell paging channel (CELL_PCH) state (e.g., a discontinuous reception or paging state), or any other suitable state. In an example embodiment, in an instance in which the mobile terminal 10 is in a CELL_PCH state the mobile terminal 10 may be transitioning from an idle mode in which power of the mobile terminal is being saved and in which no control data is currently being received or transmitted.

In the CELL_PCH state, the mobile terminal 10 may, for example, utilize a 2 ms TTI resource. In an alternative example embodiment, the mobile terminal 10 may retain this configuration (e.g., utilization of a 2 ms TTI resource) to be utilized even in an idle mode, in which the mobile terminal 10 may not be communicating any data with the neighbor cell 16 and in which the mobile terminal 10 may not have any connection to the neighbor cell 16. In response to the mobile terminal 10 waking up out of the idle mode, the mobile terminal 10 may utilize a new resource (e.g., another 2 ms TTI resource) such that the neighbor cell 16 may identify that the mobile terminal 10 is utilizing a new configuration.

In an example embodiment, in an instance in which the mobile terminal 10 enters a new cell such as, for example, a neighbor cell 16 and receives one or more resources from the neighbor cell 16, the processor of the neighbor cell 16 may instruct the mobile terminal 10 to use a newly received resource(s) (e.g., a 2 ms TTI common resource(s)) immediately. In an alternative example embodiment, the neighbor cell 16 may instruct the mobile terminal 10 to continue using a previously received hidden common E-DCH resource(s) (e.g., hidden common resources received from the serving cell 12) for a communication(s) (e.g., a RRC Connection Request, a Cell Update transmission, a URA Update transmission, etc.) with the neighbor cell 16. For example, in an instance in which a configuration for a neighbor cell 16 may be identical to a configuration for a serving cell 12, the neighbor cell 16 may instruct the mobile terminal 10 to continue using a previously received hidden common E-DCH resource(s) received from the serving cell 12. As such, the mobile terminal 10 may, but need not, obtain one or more new resources from the neighbor cell 16 upon a subsequent RACH transmission communicated to the neighbor cell, by the mobile terminal 10.

Figure 3:
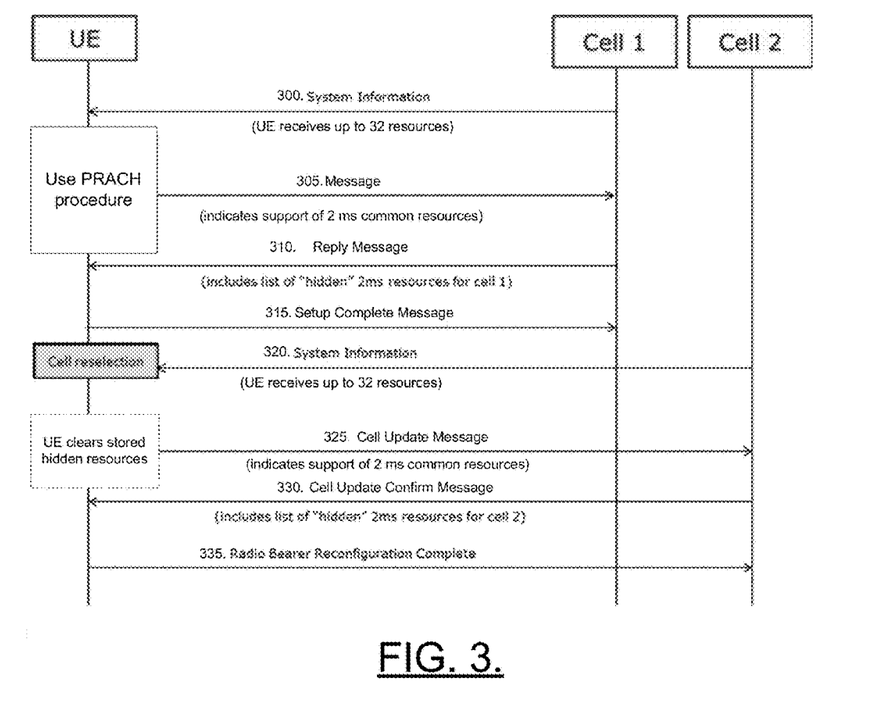
FIG. 3 is a signal flow diagram illustrating operations performed in accordance with one example embodiment of the present invention.

Referring now to FIG. 3, a signal flow diagram for enabling provision of one or more hidden common E-DCH resources to a UE is provided according to an example embodiment. At operation 300, a UE (e.g., mobile terminal 10) may receive system information from a first cell (also referred to herein as cell 1) (e.g., serving cell 12 (e.g., a Node B, a RNC)) that the UE is within. The system information may correspond to data indicating up to 32 resources of a first type of resource (e.g., 32 10 ms TTI resources). The 32 resources of the first type of resource (e.g., 32 10 TTI ms resources) may correspond to 10 ms TTI common E-DCH resources. At the outset, the first cell may send the 32 resources of the first type (e.g., 32 10 ms TTI resources) to the UE since the first cell may not initially know whether the UE is capable of utilizing 2 ms TTI resources (also referred to herein as 2 ms common resources, 2 ms common communication channel resources, or the like). At operation 305, in response to receiving the system information from the first cell, the UE may generate a message (e.g., a RRC Connection Request, a Cell Update message, a URA update message, etc.) and may send the message to the first cell indicating that the UE supports 2 ms common resources of a second type of resource (e.g., 2 ms TTI resources). In an example embodiment, the UE may utilize a PRACH procedure (e.g., a Rel-8 PRACH procedure, etc.) to send the message indicating that the UE supports the 2 ms common resources.

At operation 310, the first cell may send a reply message (e.g., a RRC Connection Setup message, a Cell Update Confirm message, a URA Update Confirm message, etc.) to the UE indicating a list or new set of hidden 2 ms resources of the second type of resource (e.g., a new set of hidden common E-DCH resources) supported by the first cell. At operation 315, the UE may send a message (e.g., a RRC Connection Setup complete message) to the first cell indicating that a setup of a resource(s) is complete in response to selection, by the UE, of at least one of the hidden 2 ms resources. In this regard, the UE may utilize a 2 ms TTI resource(s) for communicating and exchanging data with the first cell.

At operation 320, the UE may receive system information from a second cell (e.g., a neighbor cell 16 (e.g., a Node B, a RNC)) in response to being serviced by the second cell (e.g., a target cell) during a cell reselection procedure. One example in which the UE may be serviced by the second cell may include, but is not limited to, an instance in which the UE moves within a coverage area of the second cell. The system information sent by the second cell to the UE may include data indicating up to 32 resources (e.g., 32 10 ms resources) since the second cell may not initially know the TTI resource capabilities of the UE. Optionally, at operation 325, the UE may clear or delete stored hidden 2 ms common resources and may send a Cell Update message to the second cell. The Cell Update message may include data indicating to the second cell that the UE supports 2 ms common resources.

At operation 330, the second cell may send a Cell Update Confirm message to the UE indicating a list or new set of 2 ms common resources of the second type of resource supportable by the second cell. At operation 335, the UE may send the second cell a reconfiguration complete message (e.g., a Radio Bearer Reconfiguration Complete message). The reconfiguration complete message may be sent by the UE to the second cell in response to selection by the UE of a resource(s) (e.g., a best resource) from the list or new set of 2 ms common resources. In response to the selection of the resource(s), the UE may communicate with the second cell via one or more 2 ms resource TTIs (e.g., hidden 2 ms common E-DCH resources).

Figure 4:
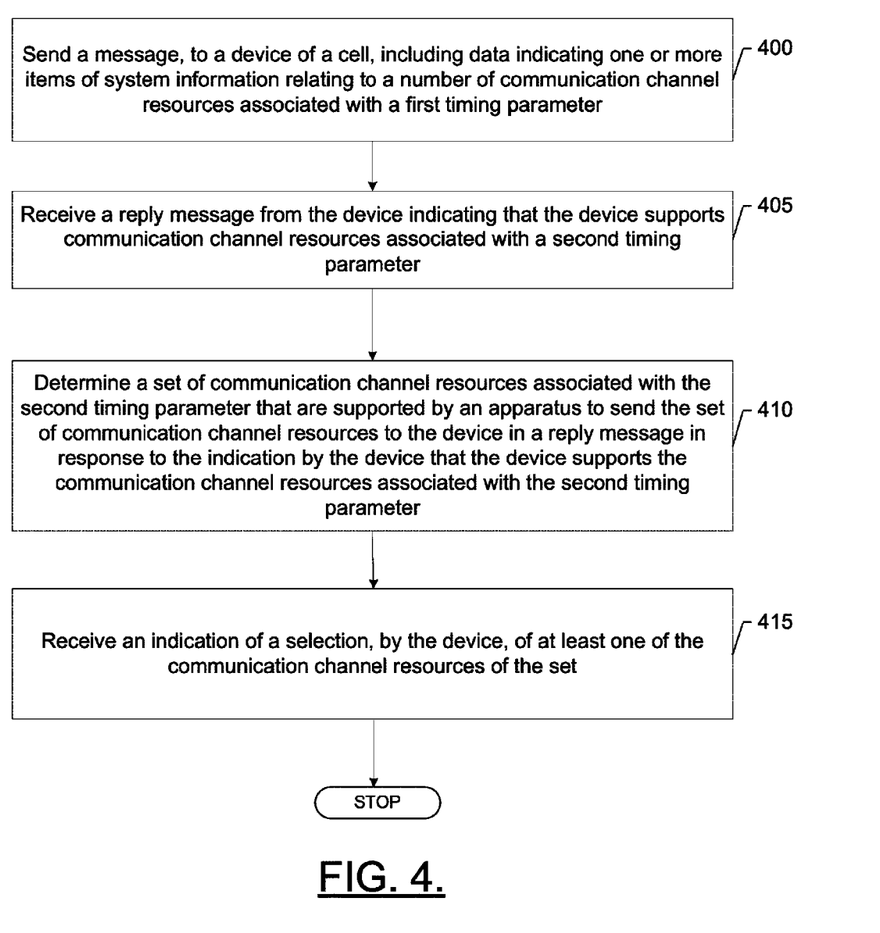
FIG. 4 is a flowchart illustrating operations performed in accordance with one embodiment of the present invention.

Referring now to FIG. 4, a flowchart of an example method for enabling provision of one or more hidden common E-DCH resources to a mobile terminal is provided according to an example embodiment. At operation 400, an apparatus (e.g., a network device (e.g., a Node B, a RNC)) may send a message, to a device (e.g., mobile terminal 10) of a cell (e.g., serving cell 12). The message may include data indicating one or more items of system information relating to a number of communication channel resources (e.g., up to 32 10 ms resources) associated with a first type of resource (e.g., a first timing parameter (e.g., a 10 ms TTI)). At operation 405, an apparatus (e.g., the network device) may receive a response message from the device (e.g., mobile terminal 10) indicating that the device supports communication channel resources (e.g., 2 ms common resources) associated with a second type of resource (e.g., a second timing parameter (e.g., a 2 ms TTI)).

At operation 410, an apparatus (e.g., the network device) may determine a set of communication channel resources (e.g., a set of hidden 2 ms common E-DCH resources) associated with the second type of resource (e.g., a second timing parameter) that are supported by the apparatus to send the set of communication channel resources to the device in a reply message in response to the indication by the device that the device supports the communication channel resources associated with the second type of resource. At operation 415, an apparatus (e.g., the network device) may receive an indication of a selection, by the device (e.g., mobile terminal 10), of at least one of the communication channel resources (e.g., a hidden 2 ms common E-DCH resource) of the set. In this regard, the apparatus may communicate with the device based in part on the selected communication channel resource.

Figure 5:
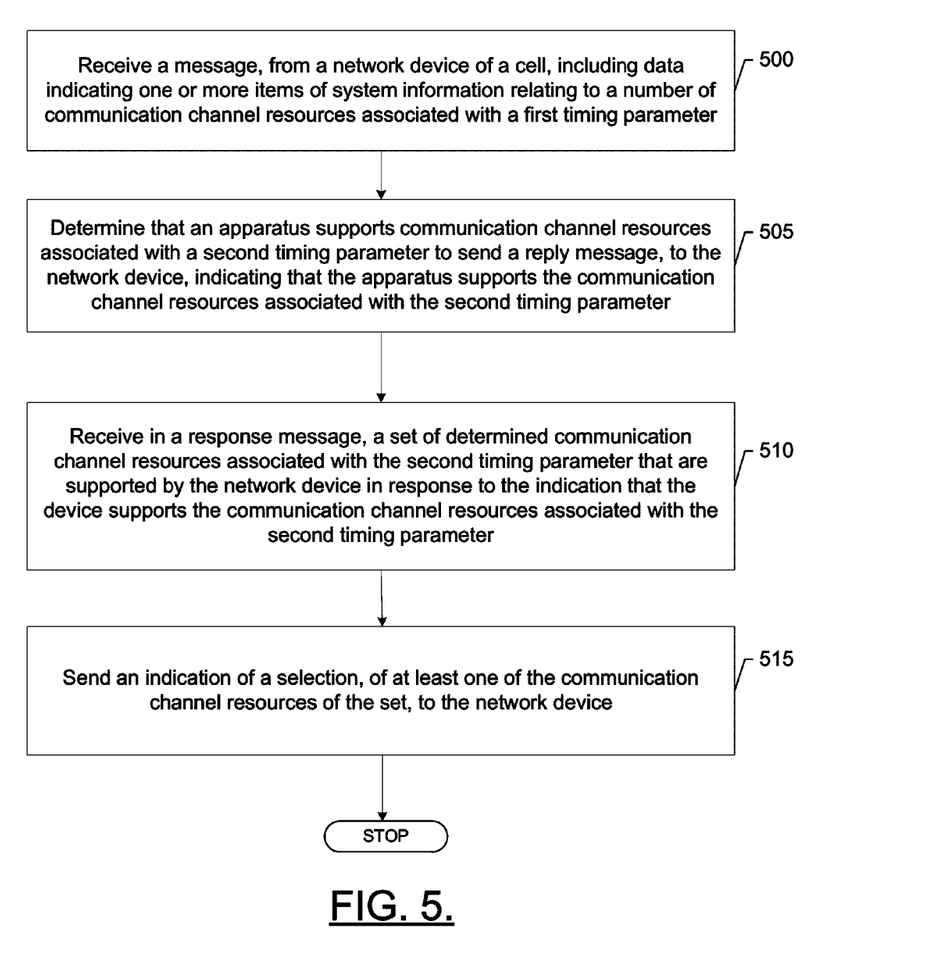
FIG. 5 illustrates the flowchart of operations performed in accordance with another embodiment of the present invention.

Referring now to FIG. 5, a flowchart of an example method for communicating one or more hidden common E-DCH resources according to an example embodiment is provided. At operation 500, an apparatus (e.g., mobile terminal 10) may receive a message, from a network device (e.g., a Node B, a RNC) of a cell (e.g., serving cell 12). The message may include data indicating one or more items of system information relating to a number of communication channel resources (e.g., up to 32 10 ms resources) associated with a first type of resource (e.g., a first timing parameter (e.g., a 10 ms TTI)). At operation 505, an apparatus (e.g., mobile terminal 10) may determine that the apparatus supports communication channel resources (e.g., 2 ms common resources) associated with a second type of resource (e.g., a second timing parameter (e.g., a 2 ms TTI)) to send a reply message, to the network device, indicating that the apparatus supports the communication channel resources.

At operation 510, an apparatus (e.g., mobile terminal 10) may receive, in a response message, a set of determined communication channel resources (e.g., hidden 2 ms common E-DCH resources) associated with the second type of resource (e.g., a second timing parameter) that are supported by the network device (e.g., a Node B, a RNC) in response to the indication that the apparatus supports the communication channel resources associated with the second type of resource. At operation 515, an apparatus (e.g., mobile terminal 10) may send an indication of a selection, of at least one of the communication channel resources (e.g., a hidden 2 ms common E-DCH resource) of the set, to the network device. In this regard, the apparatus may communicate with the network device based in part on the selected communication channel resource(s).

It should be pointed out that FIGS. 3, 4 and 5 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 28) and executed by a processor (e.g., processor 24). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 3, 4 and 5 above may comprise a processor (e.g., the processor 24) configured to perform some or each of the operations (300-335, 400-415, 500-515) described above. The processor may, for example, be configured to perform the operations (300-335, 400-415, 500-515) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (300-335, 400-415, 500-515) may comprise, for example, the processor 24 (e.g., as means for performing any of the operations described above), and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   causing sending of a message, to a device of a cell, comprising data indicating one or more items of system information relating to a number of communication channel resources associated with a first type of resource;
   receiving a response message from the device indicating that the device supports communication channel resources associated with a second type of resource;
   determining, via a processor, a set of communication channel resources associated with the second type of resource that are supported by a network device to enable sending of the set of communication channel resources to the device in a reply message in response to the indication by the device that the device supports the communication channel resources associated with the second type of resource; and
   receiving an indication of a selection, by the device, of at least one of the communication channel resources of the set, wherein
   the first type of resource comprises a first timing parameter, the second type of resource comprises a second timing parameter,
   the second timing parameter comprises a 2 millisecond enhanced transmission time interval, and the set of communication channel resources corresponds to 2 millisecond enhanced transmission time interval resources, and
   the first timing parameter comprises a 10 millisecond common enhanced dedicated channel transmission time interval, and the number of communication channel resources corresponds to 10 millisecond common enhanced dedicated channel transmission time interval resources.

2. The method of claim 1, wherein the set of communication channel resources associated with the second type of resource that are supported by the network device comprises common enhanced dedicated channel resources and wherein the method further comprises:
   restricting the common enhanced dedicated channel resources from being provided to other devices of the cell.

3. The method of claim 2, wherein causing the sending of the message comprises sending the message comprising the number of communication channel resources associated with the first type of resource to the device via a broadcast control channel.

4. The method of claim 3, further comprising:
   replacing the number of communication channel resources associated with the first type of resource communicated to the device via the broadcast control channel with the set of resources associated with the second type of resource supported by the network device.

5. The method of claim 3, further comprising adding the set of resources corresponding to the communication channel resources associated with the second type of resource supported by the network device, that are stored, with the number of communication channel resources in the response message provided to the device via the broadcast channel.

6. An apparatus comprising:
   at least one processor; and
   at least one memory including computer program code, the at least one memory and the computer program code configured to, with the at least one processor, cause the apparatus at least to:
   cause sending of a message, to a device of a cell, comprising data indicating one or more items of system information relating to a number of communication channel resources associated with a first type of resource;
   receive a response message from the device indicating that the device supports communication channel resources associated with a second type of resource;
   determine a set of communication channel resources associated with the second type of resource that are supported by the apparatus to enable sending of the set of communication channel resources to the device in a reply message in response to the indication by the device that the device supports the communication channel resources associated with the second type of resource; and
   receive an indication of a selection, by the device, of at least one of the communication channel resources of the set, wherein
   the first type of resource comprises a first timing parameter, the second type of resource comprises a second timing parameter,
   the second timing parameter comprises a 2 millisecond enhanced transmission time interval, and the set of communication channel resources corresponds to 2 millisecond enhanced transmission time interval resources, and the first timing parameter comprises a 10 millisecond common enhanced dedicated channel transmission time interval, and the number of communication channel resources corresponds to 10 millisecond common enhanced dedicated channel transmission time interval resources.

7. The apparatus of claim 6, wherein the set of communication channel resources associated with the second type of resource that are supported by the network device comprises common enhanced dedicated channel resources and the at least one memory and the computer program code are further configured to, with the at least one processor, cause the apparatus to:
restrict the common enhanced dedicated channel resources from being provided to other devices of the cell.

8. The apparatus of claim 7, wherein the at least one memory and the computer program code are further configured to, with the at least one processor, cause the apparatus to:
cause the sending of the message by sending the message comprising the number of communication channel resources associated with the first type of resource to the device via a broadcast control channel.

9. The apparatus of claim 8, wherein the at least one memory and the computer program code are further configured to, with the at least one processor, cause the apparatus to:
replace the number of communication channel resources associated with the first type of resource communicated to the device via the broadcast control channel with the set of resources associated with the second type of resource supported by the apparatus.

10. The apparatus of claim 8, wherein the at least one memory and the computer program code are further configured to, with the at least one processor, cause the apparatus to:
add the set of resources corresponding to the communication channel resources associated with the second type of resource supported by the apparatus, that are stored, with the number of communication channel resources in the response message provided to the device via the broadcast channel.

11. The apparatus of claim 6, wherein the apparatus comprises at least one of a base station or a radio network controller.

12. A method comprising:
receiving a message, from a network device of a cell, comprising data indicating one or more items of system information relating to a number of communication channel resources associated with a first type of resource;
determining, via a processor, that a device supports communication channel resources associated with a second type of resource to enable sending of the reply message, to the network device, indicating that the device supports the communication channel resources;
receiving, in a response message, a set of determined communication channel resources associated with the second type of resource that are supported by the network device in response to the indication that the device supports the communication channel resources associated with the second type of resource; and
causing sending of an indication of a selection, of at least one of the communication channel resources of the set, to the network device, wherein
the first type of resource comprises a first timing parameter, the second type of resource comprises a second timing parameter,
the second timing parameter comprises a 2 millisecond enhanced transmission time interval, and the set of communication channel resources corresponds to 2 millisecond enhanced transmission time interval resources, and
the first timing parameter comprises a 10 millisecond common enhanced dedicated channel transmission time interval, and the number of communication channel resources corresponds to 10 millisecond common enhanced dedicated channel transmission time interval resources.

13. The method of claim 12, wherein the set of communication channel resources associated with the second type of resource that are supported by the network device comprises common enhanced dedicated channel resources that are only received by the device, from the network device.

14. The method of claim 13, further comprising:
receiving, from another network device, additional system information identifying a plurality of communication channel resources in response to clearing the set of communication channel resources based in part on a selection of a new cell to provide communication services to the device.

15. The method of claim 14, further comprising:
causing sending of another indication that the device supports communication channel resources associated with the second type of resource in response to the receipt of the additional system information.

16. An apparatus comprising:
at least one processor; and
at least one memory including computer program code, the at least one memory and the computer program code configured to, with the at least one processor, cause the apparatus at least to:
receive a message, from a network device of a cell, comprising data indicating one or more items of system information relating to a number of communication channel resources associated with a first type of resource;
determine that the apparatus supports communication channel resources associated with a second type of resource to enable sending of a reply message, to the network device, indicating that the apparatus supports the communication channel resources;
receive, in a response message, a set of determined communication channel resources associated with the second type of resource that are supported by the network device in response to the indication that the apparatus supports the communication channel resources associated with the second type of resource; and
cause sending of an indication of a selection, of at least one of the communication channel resources of the set, to the network device, wherein
the first type of resource comprises a first timing parameter, the second type of resource comprises a second timing parameter,
the second timing parameter comprises a 2 millisecond enhanced transmission time interval, and the set of communication channel resources corresponds to 2 millisecond enhanced transmission time interval resources, and
the first timing parameter comprises a 10 millisecond common enhanced dedicated channel transmission time interval, and the number of communication channel resources corresponds to 10 millisecond common enhanced dedicated channel transmission time interval resources.

17. The apparatus of claim 16, wherein the set of communication channel resources associated with the second type of resource that are supported by the network device comprises common enhanced dedicated channel resources that are only received by the apparatus, from the network device.

18. The apparatus of claim 17, wherein the at least one memory and the computer program code are further configured to, with the processor, cause the apparatus to:
receive additional system information identifying a plurality of communication channel resources from a network device in response to the apparatus clearing the set of communication channel resources based in part on a selection of a new cell to provide communication services to the apparatus.

19. The apparatus of claim 18, wherein the at least one memory and the computer program code are further configured to, with the processor, cause the apparatus to:
cause sending of another indication that the apparatus supports communication channel resources associated with the second type of resource in response to the receipt of the additional system information.

20. The apparatus of claim 16, wherein the apparatus comprises a mobile terminal.

* * * * *